Fig. 1  Schematic drawing of a batch process for the precipitation of AUC.

Fig. 2  Schematic drawing of a continuous process for the precipitation of AUC

Schematic drawing of a fluidized bed furnace for the reduction of AUC to $UO_2$.

Schematic drawing of a continuous fluidized bed process for the reduction of AUC to $UO_2$.

United States Patent Office 3,519,403
Patented July 7, 1970

3,519,403
METHOD FOR THE PREPARATION OF URANIUM DIOXIDE POWDER (UO₂) WITH GOOD PRESSING AND SINTERING PROPERTIES FROM URANIUM HEXAFLUORIDE (UF₆) OR AQUEOUS SOLUTIONS OF URANYL NITRATE [UO₂(NO₃)₂]
Horst Vietzke, Grossauheim (Main), Fritz Ploger, Kleinostheim (Main), Klaus Wegner, Hanau am Main, and Hans Pirk, Dornigheim (Main), Germany, assignors to Nukem Nuklear-Chemie und -Metallurgie G.m.b.H., Wolfgang, near Hanau am Main, Germany
Filed Dec. 18, 1967, Ser. No. 691,581
Claims priority, application Germany, Dec. 17, 1966, N 29,688; Mar. 1, 1967, N 30,086
Int. Cl. C01g 43/02
U.S. Cl. 23—355                     14 Claims

ABSTRACT OF THE DISCLOSURE

Uranium dioxide of good pressing and sintering behavior is prepared by precipitating ammonium uranyl carbonate by continuously introducing as gases UF₆, NH₃ and CO₂ into an ammonium carbonate solution having a constant pH of 7.8 to 8.6 followerd by spontaneously decomposing and gas reducing the ammonium uranyl carbonate in a furnace to obtain a pure uranium dioxide powder. The reduction is preferably carried out in a fluidized bed at 500° to 600° C. using a mixture of hydrogen and water vapor.

---

This invention relates to a method for the conversion of uranium hexafluoride (UF₆) or aqueous solutions of uranylnitrate [UO₂(NO₃)₂] into the ammonium uranyl carbonate (NH₄)₄[UO₂(CO₃)₃] and the conversion of that product into a very pure, free flowing UO₂ powder which is without further treatment pressed and sintered to give ceramic bodies of high quality. In the existing generation of light water moderated nuclear reactors mainly dense, sintered UO₂ containing up to 5% U-235 is used as nuclear fuel.

At this time the starting material is almost without exception uranium hexafluoride (UF₆), which, after chemical conversion to UO₂ powder is worked into UO₂ bodies of high density and surface quality by oxide ceramic methods.

The wet chemical processes developed up to now for the preparation of UO₂ powders from UF₆ and uranylnitrate solutions comprise numerous steps with partly limited specific throughput. So for instance UF₆ is reacted with water to give an aqueous solution of UO₂F₂+4HF, from which by addition of ammonia the uranium is precipitated as ammonium diuranate (NH₄)₂U₂O₇ (ADU). In succeeding steps these precipitates will be filtrated, dried, calcined and reduced, whereby during the calcination and/or reduction at temperatures near 700° C. the oxide is steam-treated to remove the large amounts of fluorine (2–4%) which are unavoidably contained in the precipitate.

This multi-step, labour intensive process with small specific throughput gives rises to a UO₂, product of unsatisfying quality especially with regard to its pressing and sintering properties, as well as its purity.

This UO₂ can not be pressed directly but must be milled, granulated under addition of several weight percent of an organic binder, broken up and sieved prior to pressing. Before sintering the pellets pressed from this granulate the organic binder must be removed by a separate dewaxing step. To better the poor sinterability of this powder the milling must be carried out with a jet mill, if an oxidation reduction treatment of the powder should not be sufficient.

This description shows clearly in what complicated way UO₂ powder of good pressing and sintering properties has been prepared up to now. The multitude of these process steps, the parameters of which can hardly be kept constant, gives rise to noticeable differences in the quality of separate UO₂ charges, which again causes considerable difficulties during pressing and sintering.

Now, a wet chemical process for converting UF₆ to UO₂ with (NH₄)₄[UO₂(CO₃)₃] as an intermediate product, has been developed, which shows none of these difficulties.

This process is carried out by converting vaporous UF₆ with gaseous NH₃, CO₂ and water, or with an aqueous solution of ammonium carbonate or with solid ammonium carbonate, whereby AUC is precipitated and subsequently decomposed to pure uranium dioxide powder as set forth hereinafter.

The invention will be understood best when considered in connection with the drawings wherein.

Figure 1:
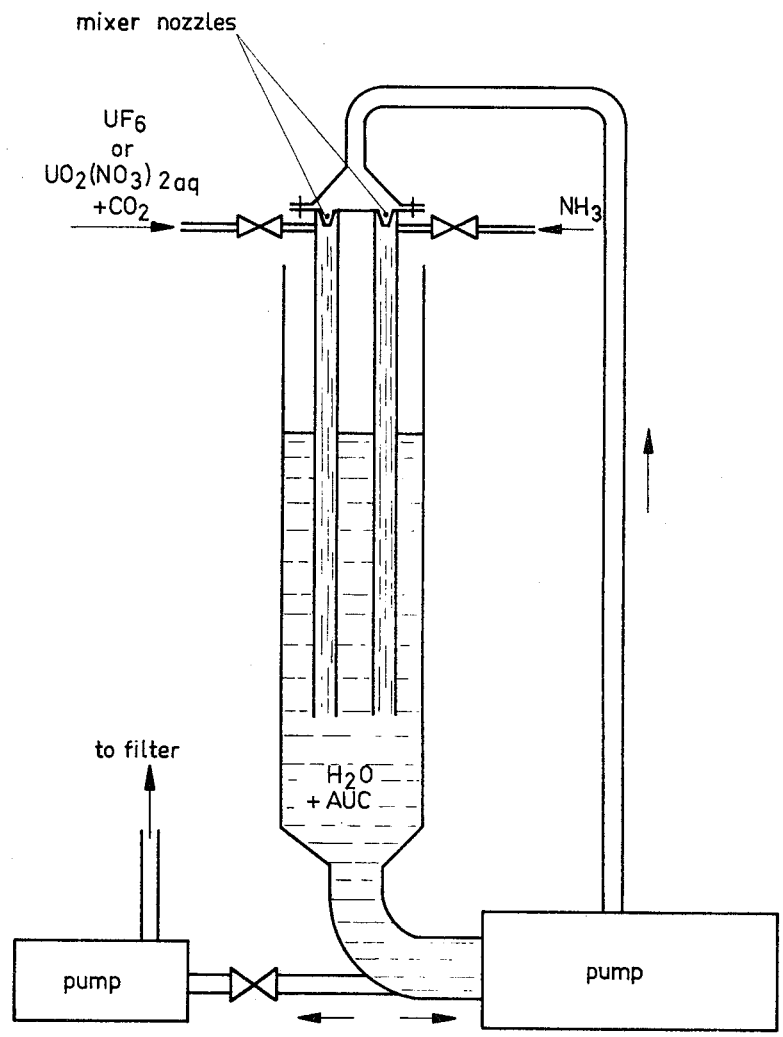
FIG. 1 is a schematic drawing of a batch process for the precipitation of ammonium uranyl carbonate (AUC) according to the invention.

Referring more specifically to FIG. 1 of the drawings, there is shown a process wherein UF₆ gas and CO₂ gas are fed to mixer nozzles where they are mixed with ammonia gas and introduced to an aqueous solution of ammonium uranyl carbonate (AUC), whereby the AUC is precipitated. A portion of the resulting AUC suspension is pumped to a filter where the AUC is removed. The balance of the AUC suspension is recirculated with the aid of a pump to the mixing nozzle.

Figure 2:
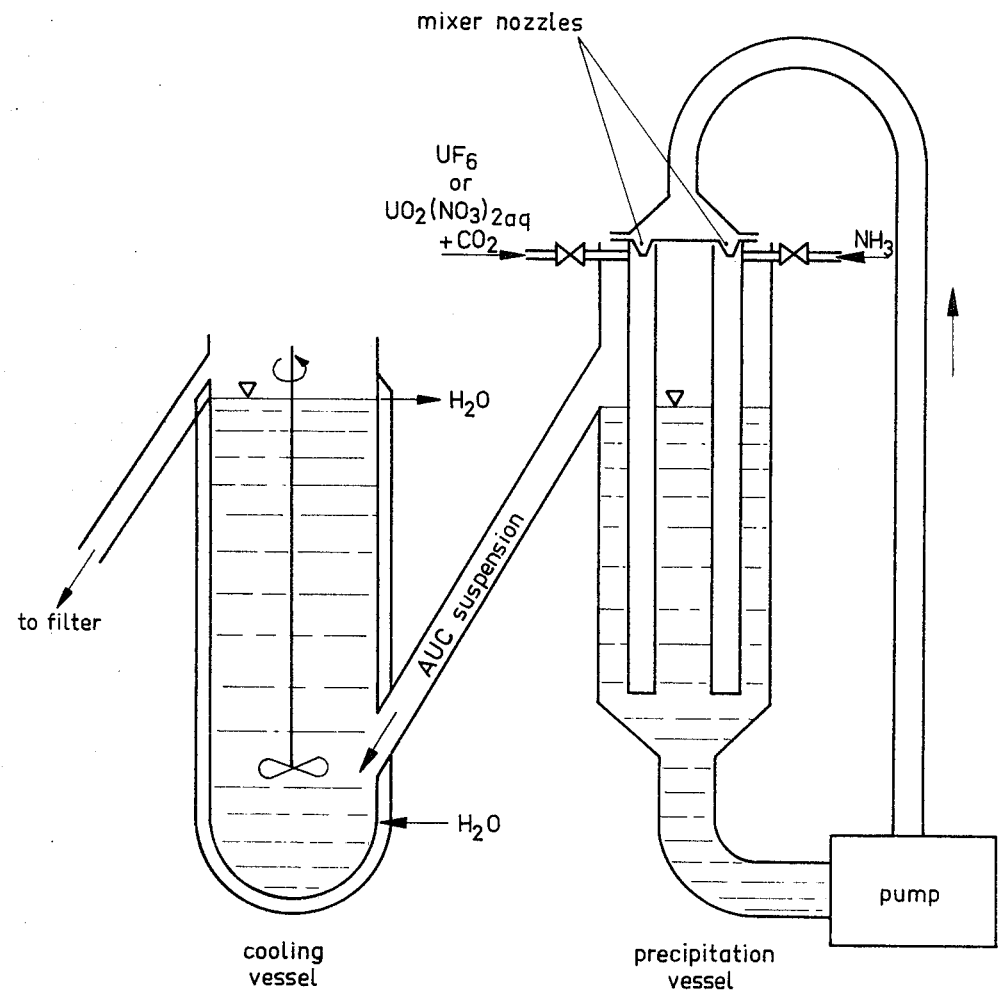
FIG. 2 is a schematic drawing of a continuous process for the precipitation of AUC.

FIG. 2 illustrates a modification of the process of FIG. 1, whereby the process can be carried out continuously. The UF₆, CO₂ and N₃ are continuously mixed and fed into a first precipitation vessel containing water and AUC, the AUC suspension overflows into a second cooling vessel which is stirred. The suspension goes to a filter where the AUC is removed and water is removed. A portion of the suspension in the first precipitation vessel is continuously pumped through the mixing nozzles.

Figure 3:
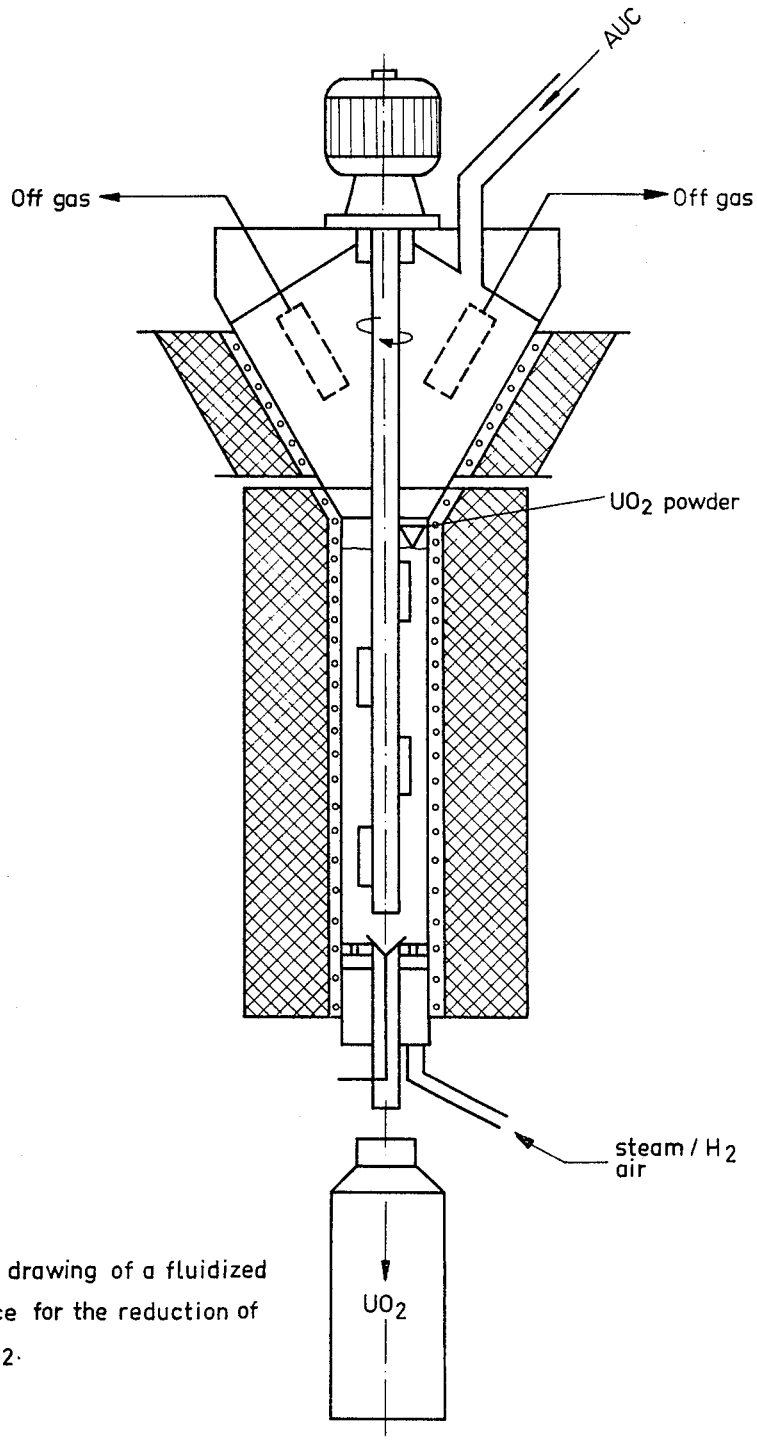
FIG. 3 is a schematic drawing of a fluidized bed furnace for the reduction of AUC to UO₂.

As shown in FIG. 3, hot fluidizing gases, e.g. a mixture of water vapor and hydrogen, are introduced in a sintered metal bottom plate in the furnace. Moist AUC filter cake is fed into the top of the furnace through a suction hose. The gases leaving the fluidized bed pass through sintered metal filters (indicated by the dotted lines near the top of the furnace) to hold back entrained UO₂ powder. The UO₂ is maintained at 600° C. to reduce the fluorine content of the UO₂ and then the hydrogen shut off and air introduced to stabilize the UO₂ formed which is then recovered.

Figure 4:
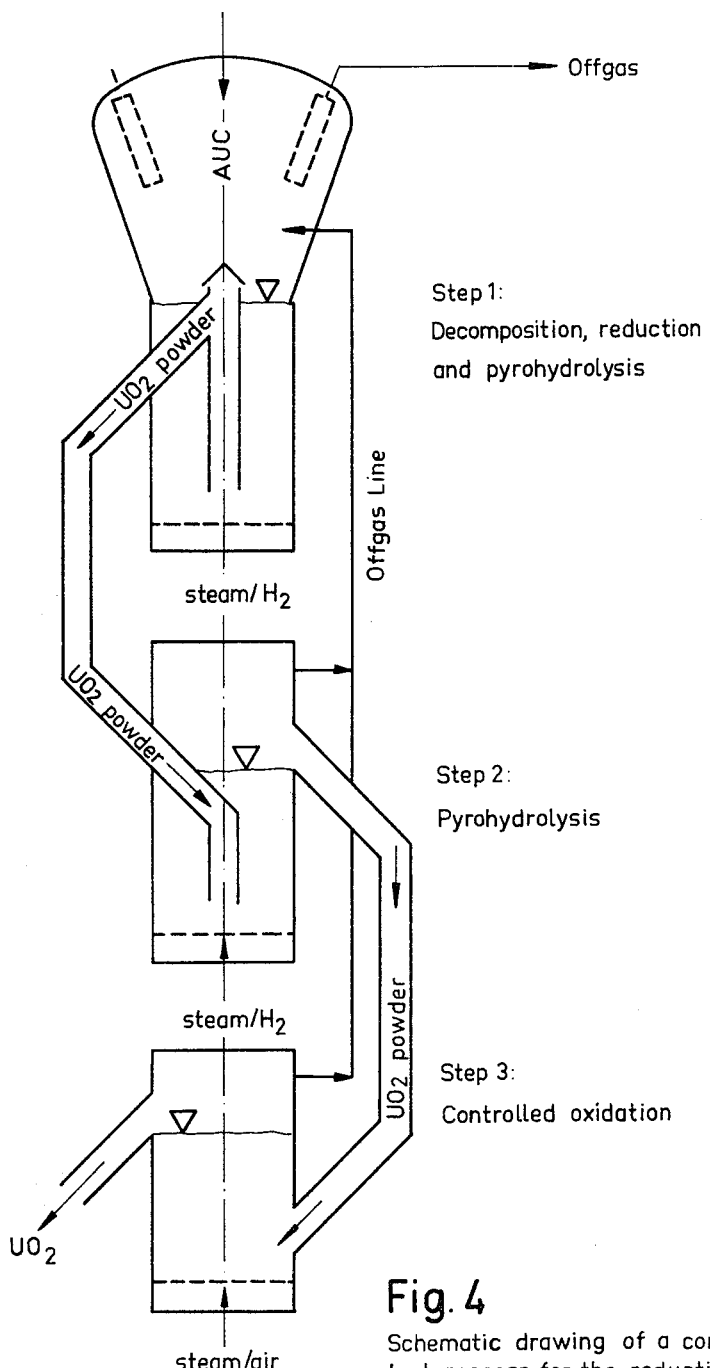
FIG. 4 is a schematic drawing of a continuous fluidized bed process for the reduction of AUC to UO₂.

FIG. 4 shows the continuous fluidized bed formation of UO₂ wherein AUC filter cake is added at the top of a three zone furnace. It is injected into a first fluidized bed where it is reduced with a mixture of hydrogen and steam to give a UO₂ powder which is passed to a second fluidized bed wherein the steam and hydrogen mixture present removes the last traces of fluorine. The UO₂ powder then passes to the third or bottom fluidized bed where a mixture of steam and air provide controlled oxidation to stabilize the UO₂. The off gases from the two lower fluidized beds are introduced above the upper fluidized bed and form a part of the off gases.

By freeding gases NH₃, CO₂ and UF₆ continuously into a measured quantity of water, the uranium content in the suspension can be increased up to 250 g. U/l., without any increase in the soluble uranium component beyond 20 g. U/l., with the result that no ammonium uranyl double fluorides are formed. Accordingly, the precipitated product contains only a very small quantity of fluorine. In order that the components may be uniformly mixed and completely absorbed by water, it has proved to be of advantage to circulate the water contained in a suitable reaction vessel through the mixer nozzles and to feed the gases to these mixer nozzles.

Although one mixer nozzle may be used for each component, it is also possible without difficulty to feed both the $UF_6$ vapor and the $CO_2$ gas together in a common mixer nozzle. The method of the precipitation according to the invention as just described is schematically shown in FIG. 1.

The use of gaseous $NH_3$ and $CO_2$, instead of ammonium carbonate solution or solid ammonium carbonate has technological advantages. For example, these gases are mostly not only purer than the salt or solution, a factor of decisive importance so far as the degree of nuclear purity required is concerned, they are also more readily metered into the precipitation vessel.

The crystals become smaller as the rate of precipitation increases, and larger as the precipitation temperature increases. The increased tendency which AUC has to decompose at temperatures from 60° C. upwards imposes an upper limit of around 70° C. on the precipitation temperature. It is possible by varying both the rate of precipitation and the precipitation temperature between 45 and 65° C. to vary the grain size of the precipitated product between 10 and 200μ, which satisfies most of the variety of requirements of the uranium dioxide ($UO_2$) obtained from it.

The maintenance of a relatively narrow pH-range from 7.8 to 8.6 is of particular importance so far as the quality of the precipitate and the production of a uranium-poor filtrate are concerned. Although AUC is particularly loose and readily filterable at a pH-value of 7.8 the suspension nevertheless has a tendency to foam at the preferred precipitation temperature of around 60° C., leading to operation difficulties. In addition, the filtrate of such a precipitation contains up to 200 mg. U/l. The quality of the precipitate is not really affected in a pH-range of from 8 to 8.3, which is maintained very readily by the marked buffeirng effect of the suspension. At the same time, however, the uranium content of the filtrate drops to less than 100 mg. U/l., which corresponds to a loss of less than 0.05% at a precipitation concentration of between 200 and 250 g. U/l. Another advantage of working in the alkaline range is that there are no corosion problems due to the presence of fluorine ions, with the result that vessels made of high-grade steel be used.

A major advantage of the precipitation process according to the invention is that precipitation may be continued up to final concentrations of around 250 g. uranium per litre, without any deterioration in the quality of the precipitate. A relatively concentrated suspension is formed of AUC crystals which, during recycling of the suspension, rub against one another and so become rounded, giving a particularly free-flowing $UO_2$. This high precipitation concentration enables the consumption of chmicals to be reduced very appreciably. At 200 g. U/l. for example, the required excess of ammonium carbonate formed still only comprises one quarter of that required for the precipitation of AUC with solid ammonium carbonate at 100 g. U/l., in order to obtain <200 mg. U/l. in the filtrate. Since however the amount of filtrate in precipitations from 100 g. U/l. is twice as large, the uranium loss is twice as high.

The precipitation process according to the invention may with advantage also be carried out continuously. After the required final concentration of 200–250 g. U/l. has been reached, water or aqueous solutions are fed into the precipitataion vessel, whilst the suspension, uniform in concentration, is allowed to flow continuously through an overflow into a cooling vessel which is also provided with an overflow through which the cooled suspension (20° C.) is delivered to a filter. During cooling the pH-value of the suspension is preferably raised to above 9. Since in the processing of uranium which is enriched with the lighter isotope U-235, the geometrically "safe" diameters are determined in dependence upon the level of enrichment, it is possible to obtain a really high throughput per mixer nozzle system by carrying out precipitation continuously in this way.

The products of precipitation are readily filtered, for example in a vacuum filter or drum filter. The precipitate may readily be washed by spraying it with an ammonium carbonate solution saturated at room temperature, and after drying in vacuo still contains only 2 to 6% of adhering water. An AUC treated in this way has a fluorine content of less than 0.05% and shows the following other properties.

Specific surface (BET): <0.2 m.$^2$/g.
Shape of crystals: prismatic crystals with rounded corners and edge, whose ratio of length/diameter is between 1:1 and 3:1
Average grain size: 20–40μ (sieved)
Bulk density: 1.0–1.5 g./cm.$^3$
Tap density: 1.2–1.7 g./cm.$^3$
Uranium content: 40–45%

It was also found, that in a very similar way an ammonium uranyl carbonate $(NH_4)_4[UO_2(CO_3)_3]$ of the same chemical and physical properties is precipitated from aqueous uranyl nitrate solutions $[UO_2(NO_3)_2]$ which originate from scrap recovery processes or from reprocessing of irradiated nuclear fuel elements.

The precipitation of AUC from uranyl nitrate solutions is carried out batchwise or continuously using gaseous $NH_3$ and $CO_2$ or ammonium carbonate solution or solid ammonium carbonate as precipitating agent.

The method of the precipitation process and the apparatus used are principally the same as in the case of the above described conversion of $UF_6$.

Now it was found, that the preparation of $UO_2$ powders, which are suited for direct binderless pressing, and show besides a good sinterability an exceptional purity, is possible by feeding thus precipitated moist AUC at a temperature of 500°–600° C. into a fluidized bed of $UO_2$ and water vapor/hydrogen atmosphere.

The fluidized bed is operated far above the gas rate at which fluidization sets on to ensure a rapid mixing and to avoid agglomeration of particles and the caking of the fluidized bed.

Because of the good heat transfer in a fluidized bed the drying and decomposition of the AUC particle as well as the following reduction to $UO_2$ are made possible under extremely smooth conditions, that means under conservation of the particle shape and development of a relatively high inner surface. Thus the conversion of the AUC gives rise to desirable powder properties, i.e. low fluorine content, free flowing, high specific surface etc. These properties can be conserved during the following pyrohydrolysis of the $UO_2$ powder by the application of relatively low temperatures of max. 650° C. According to the nearly stoichiometric composition and the high specific surface the thus produced, $UO_2$ powder is pyrophoric in air atmosphere at room temperature. Therefore, the $UO_2$ is stabilized in a fluidized bed at 600° C. by introduction of air into the fluidizing water vapor, so that the $UO_2$ undergoes controlled limited oxidation up to $UO_{2.06}$–$UO_{2.16}$. The preparation of $UO_2$ from AUC can be carried out batchwise or continuously.

EXAMPLE 1

500 l. of deionized water are fed into a geometrically safe precipitation vessel and are circulated via mixer nozzles. 72 kg. $UF_6$ vapor/h. and 44.2 kg. $CO_2$ gas/h. are then continuously fed to one mixer nozzle, while 43 kg.

$NH_3$ gas/h. are continuously fed to the second mixer nozzle. After 2¾ hours one batch of 196 kg. $UF_6$ is completed. The introduction of $UF_6$ is stopped, whereas the introduction of $CO_2$ and $NH_3$ is continued, in order to obtain a filtrate with low content of soluble uranium (200 mg. U/l.) so that not more than 0.1% of the uranium is lost to the filtrate.

Finally the suspension is cooled below 20° C., filtrated and the filter cake is washed three times with 33 l. of an one molar ammonium carbonate solution.

EXAMPLE 2

In this precipitation method gaseous $NH_3$ and $CO_2$ can be replaced partly or totally by ammonium carbonate solutions or solid ammonium carbonate, if a continuous feed of these precipitation agents is ensured. In this way the precipitation agents which are recovered from the filtrate and the off gases of the precipitation and reduction steps are reused.

EXAMPLE 3

150 l. deionized water are placed into a geometrically safe percipitation vessel and circulated via mixer nozzles. 44.2 kg. $CO_2$ gas/h. and 50 kg. $NH_3$ gas/h. are separately fed into the suspension by way of two mixing nozzles. Uranyl nitrate solution is introduced through a third mixing nozzle.

In the course of 3 hours 133 kg. U as an uranyl nitrate solution, containing 400 g. U/l. and 1 molar of free nitric acid are continuously added. Further, the suspension is treated as described in Example 1. The AUC precipitated from uranyl nitrate solutions has the same properties as AUC originating from $UF_6$.

EXAMPLE 4

The conversion of both $UF_6$ and dissolved uranyl nitrate into AUC, as described in Examples 1-3, is carried out in a continuous way in a two step precipitation process. Thereby the reactants are continuously fed into the first precipitation vessel, while the AUC-suspension overflows into a second cooling vessel. A schematic drawing of the apparatus is shown in FIG. 2. The thus precipitated AUC has the same properties as the batchwise precipitated product.

EXAMPLE 5

Into a heated fluidised bed furnace (FIG. 3 shows a schematic drawing of this furnace) with safe diameter the 600° C. hot fluidising gases, for instance 30 $Nm.^3$ water vapor/h. and 4.5 $Nm.^3$ $H_2$/h. are introduced through a sintered metal bottom plate.

In the course of 4 hours about 330 kg. of moist AUC filter cake, corresponding to 150 kg. $UO_2$ are fed into the furnace at a steadily increasing rate. The moist AUC with less than 10% of adhering water is, according to the method of the invention, cut from a horizontally turning vacuum plate filter by a shearing knife which moves slowly from the center to the periphery. The AUC is then transferred to the fluidised bed furnace through a suction hose. The AUC is introduced portionwise every 20 sec. by pneumatic injection into the fluidised bed. The time between two successive injections is so chosen that complete decomposition of AUC is ensured, whereby large amounts of gases are liberated. The gases leaving the fluidised bed pass through sintered metal filters to hold back entrained $UO_2$ powder, before they enter into a scrubber.

After the feeding period the temperature of the fluidised bed is kept one more hour at 600° C., to reduce the fluorine content of the $UO_2$ to less than 50 p.p.m. Following this pyrohydrolysis period the stream of hydrogen is shut off to introduce air at such a rate that the O:U ratio is raised within ½ hour to preset values between 2.06 and 2.16. After the stabilisation of the $UO_2$ by this partial oxidation the complete batch is discharged into a cooling container. The thus obtained $UO_2$ powder shows the following properties.

Specific surface: 5–6 $m.^2$/g.
Bulk density: 2.0–2.2 $g./cm.^3$
Tap density: 2.5–2. $g./cm^3$
Flow characteristic: 3–8 g./sec.

(defined by the free flow of powder from a metal funnel with outlet diameter 4 mm. and opening angle 60°).

O:U ratio: 2.06–2.16
Water content: 0.1%–0.25%
Uranium content: 87.40%
F: <50 p.p.m.
Fe: 10 p.p.m.
Cr: 10 p.p.m.
Ni: 6 p.p.m.
V: 3 p.p.m.
W: 2 p.p.m.
N: 6 p.p.m.

Typical grain size distribution
(sedimentation analysis):

| | Percent |
|---|---|
| <6μ | 20 |
| 6–10μ | 25 |
| 10–14μ | 25 |
| 14–18μ | 15 |
| >18μ | 15 |

EXAMPLE 6

The preparation of $UO_2$ from moist AUC is carried out in a two step batch process by injecting AUC portionwise into a bed of $UO_2$, fluidised with water vapor at 300° C. under which conditions AUC is decomposed spontaneously to give a very reactive $UO_3$ power. This $UO_3$ powder is then fed portionwise to a fluidised bed of $UO_2$ and a water vapor/hydrogen atmosphere of 600° C., where it is reduced rapidly to $UO_2$ under conserving its favourable powder properties. The $UO_2$ is than treated as described in Example 5. The average throughput of this process in geometrical safe fluidised bed furnaces of 300 mm. diameter is about 60 kg. $UO_2$/h., which shows the same characteristic properties as described in Example 5.

EXAMPLE 7

The continuous preparation of $UO_2$ from moist AUC is carried out in such a way, that moist AUC is taken from a continuous filter at a rate of 100 kg. AUC/h. and injected in small portions into a first fluidised bed where it is calcined at 300° C. to give $UO_3$ or directly reduced with hydrogen at 600° C. to give $UO_2$.

In a second fluidised bed, $UO_3$ is reduced at a temperature of 600° C. with hydrogen. The steam treatment of the $UO_2$ in this fluidised bed removes last traces of fluorine.

In the third fluidised bed, $UO_2$ is stabilised at 600° C. by controlled limited oxidation with air to values between 2.06–2.16. (FIG. 4 shows a schematic drawing of the apparatus.) The $UO_2$ powder prepared according to this continuous production process shows the same characteristic properties as described in Example 5.

Having thus described our invention, we claim:

1. The method of preparing uranium dioxide of good pressing and sintering behavior comprising precipitating ammonium uranyl carbonate and forming a suspension thereof by introducing the three reaction components $UF_6$, $NH_3$ and $CO_2$ as gases into an aqueous ammonium uranyl carbonate containing solution at a pH value maintained between 7.8 and 8.6 and thereafter spontaneously decomposing and gas reducing the precipitated ammonium uranyl carbonate in a furnace at elevated temperature to obtain a pure uranium dioxide powder.

2. The method according to claim 1, wherein the precipitation is carried out at an elevated temperature up to 70° C.

3. A process according to claim 2, wherein the precipitation is completed by cooling the suspension of ammonium uranyl carbonate in mother liquor to room temperature and permitting the pH to rise to 9.

4. A process according to claim 1, wherein the three gaseous reaction components are fed to mixer nozzles through which the aqueous suspension of ammonium uranyl carbonate is recirculated to increase the rate of absorption of the three gases.

5. A process according to claim 1, including the steps of carrying out the precipitation continuously and overflowing the suspension of the AUC continuously to a second vessel and cooling the suspension in said second vessel.

6. A process according to claim 1, wherein the precipitated ammonium uranyl carbonate is fed to a furnace containing a fluidized bed of $UO_2$ powder in a water vapor-hydrogen atmosphere containing about 13% $H_2O$ at 500 to 600° C. to decompose the ammonium uranyl carbonate.

7. A process according to claim 1, comprising feeding the precipitate to a fluidized bed portionwise with a sufficient time interval between two succeeding feedings to permit the spontaneous decomposition to go to completion between each successive feeding.

8. A process according to claim 1, wherein the amount of hydrogen is chosen so that the ammonium uranyl carbonate is reduced completely to $UO_2$.

9. A process according to claim 1, wherein the reduction to $UO_2$ is carried out at 500 to 600° C.

10. A process according to claim 1, comprising carrying out the decomposition of the ammonium uranyl carbonate in a fluidized bed operated far above the velocity at which fluidization begins so that a sufficiently fast mixing is obtained compared to the reaction rate of the ammonium uranyl carbonate feed and agglomeration of $UO_2$ particles and caking of the fluidized bed are avoided.

11. A process according to claim 1, wherein the last traces of fluorine are removed from the $UO_2$ in the step of pyrohydrolysis at temperatures near 600° C.

12. A process according to claim 1, wherein the $UO_2$ formed is stabilized against pyrophoric reaction by controlled limited oxidation by introducing air at a temperature of 600° C. into the $UO_2$ water vapor fluidized bed whereby the composition of the $UO_2$ product can be fixed at a predetermined value between $UO_{2.06}$ and $UO_{2.16}$.

13. A process according to claim 1, wherein the conversion of the ammonium uranyl carbonate precipitate to $UO_2$ is carried out in a plurality of steps including decomposing the precipitate spontaneously at 300° C. in a fluidized bed made of $UO_3$ and water vapor in a first step and directly reducing the product thus obtained to $UO_2$ in a second step at a temperature of 600° C. in a fluidized bed made up of $UO_2$ and a water vapor-hydrogen atmosphere.

14. A process according to claim 1 which is carried out continuously and in which the formation of $UO_2$ is carried out with the aid of three fluidized beds in the furnace, including the steps of (1) forming $UO_3$ or $UO_2$ in the first fluidized bed, (2) reducing and pyrohydrolyzing the product from the first fluidized bed in the second fluidized bed and (3) stabilizing the product from the second fluidized bed from becoming pyrophoric in air in the third fluidized bed at a temperature of 300 to 600° C. by employing air-water vapor in the third bed.

References Cited

UNITED STATES PATENTS

| 3,227,514 | 1/1966 | Vertes et al. | 23—355 |
| 3,052,513 | 9/1962 | Crouse | 23—334 |

FOREIGN PATENTS

| 1,126,363 | 3/1962 | Germany. |
| 3,659,164 | 7/1964 | Japan. |

CARL D. QUARFORTH, Primary Examiner

M. J. McGREAL, Assistant Examiner